United States Patent
Ellman et al.

(10) Patent No.: US 8,912,130 B2
(45) Date of Patent: Dec. 16, 2014

(54) METHODS OF FORMING AND USING A SOLID-PHASE SUPPORT

(75) Inventors: Brett Ellman, San Diego, CA (US);
Michal Lebl, San Diego, CA (US);
Aaron Jones, San Diego, CA (US);
Steve Fambro, San Diego, CA (US);
David Heiner, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 0 days.

(21) Appl. No.: 13/235,269

(22) Filed: Sep. 16, 2011

(65) Prior Publication Data

US 2012/0012250 A1 Jan. 19, 2012

Related U.S. Application Data

(62) Division of application No. 10/651,568, filed on Aug. 29, 2003, now Pat. No. 8,022,013.

(51) Int. Cl.
| | | |
|---|---|---|
| C40B 50/18 | (2006.01) | |
| B82Y 30/00 | (2011.01) | |
| B01J 19/00 | (2006.01) | |
| B01L 3/00 | (2006.01) | |
| C40B 40/06 | (2006.01) | |
| C40B 40/10 | (2006.01) | |
| C40B 40/14 | (2006.01) | |
| C40B 50/14 | (2006.01) | |
| C40B 60/14 | (2006.01) | |

(52) U.S. Cl.
CPC ............ B82Y 30/00 (2013.01); B01J 19/0046 (2013.01); B01L 3/5085 (2013.01); *B01J 2219/00315* (2013.01); *B01J 2219/00355* (2013.01); *B01J 2219/00421* (2013.01); *B01J 2219/00463* (2013.01); *B01J 2219/0049* (2013.01); *B01J 2219/005* (2013.01); *B01J 2219/00509* (2013.01); *B01J 2219/00527* (2013.01); *B01J 2219/0059* (2013.01); *B01J 2219/00596* (2013.01); *B01J 2219/00648* (2013.01); *B01J 2219/00659* (2013.01); *B01J 2219/00675* (2013.01); *B01J 2219/0072* (2013.01); *B01J 2219/00722* (2013.01); *B01J 2219/00725* (2013.01); *B01L 2200/12* (2013.01); *B01L 2300/069* (2013.01); *B01L 2300/0851* (2013.01); *C40B 40/06* (2013.01); *C40B 40/10* (2013.01); *C40B 40/14* (2013.01); *C40B 50/14* (2013.01); *C40B 60/14* (2013.01)
USPC .................. 506/32; 506/23; 156/60; 427/180

(58) Field of Classification Search
None
See application file for complete search history.

(56) References Cited

U.S. PATENT DOCUMENTS

| | | | | |
|---|---|---|---|---|
| 2,874,526 | A | * | 2/1959 | Fauth et al. ..................... 53/314 |
| 4,061,701 | A | | 12/1977 | Stastny et al. |
| 4,158,085 | A | | 6/1979 | Bilhorn |
| 4,421,684 | A | | 12/1983 | Nakashima et al. |
| 4,774,058 | A | | 9/1988 | Mehl |
| 5,022,988 | A | * | 6/1991 | Okarma et al. .......... 210/321.84 |
| 5,177,023 | A | | 1/1993 | Sutton et al. |
| 5,202,418 | A | | 4/1993 | Lebl et al. |
| 5,338,831 | A | | 8/1994 | Lebl et al. |
| 5,342,585 | A | | 8/1994 | Lebl et al. |
| 5,688,370 | A | | 11/1997 | Hagen et al. |
| 5,746,982 | A | * | 5/1998 | Saneii et al. ................... 422/134 |
| 5,884,660 | A | * | 3/1999 | Cathrein et al. ......... 137/614.01 |
| 6,043,067 | A | | 3/2000 | Lihme et al. |
| 6,045,755 | A | | 4/2000 | Lebl et al. |
| 6,121,054 | A | | 9/2000 | Lebl |
| 6,309,608 | B1 | * | 10/2001 | Zhou et al. ...................... 506/40 |
| 6,355,431 | B1 | | 3/2002 | Chee et al. |
| 6,376,256 | B1 | | 4/2002 | Dunnington et al. |
| 6,429,027 | B1 | | 8/2002 | Chee et al. |
| 6,682,702 | B2 | | 1/2004 | Barth et al. |
| 2002/0044894 | A1 | | 4/2002 | Lebl et al. |
| 2002/0102578 | A1 | | 8/2002 | Dickinson et al. |
| 2002/0177141 | A1 | | 11/2002 | Chee et al. |
| 2002/0187515 | A1 | | 12/2002 | Chee et al. |
| 2004/0009584 | A1 | * | 1/2004 | Mitra et al. ................ 435/287.2 |
| 2004/0023019 | A1 | | 2/2004 | Vandenberg et al. |
| 2005/0173059 | A1 | | 8/2005 | Ringleben et al. |
| 2007/0184456 | A1 | * | 8/2007 | Chee et al. ......................... 435/6 |

FOREIGN PATENT DOCUMENTS

| | | |
|---|---|---|
| DE | 19920156 | 1/2000 |
| EP | 0175195 | 3/1986 |
| EP | 0445915 | 9/1991 |
| WO | WO 89/08705 | 9/1989 |
| WO | WO 92/00799 | 1/1992 |
| WO | WO 98/41534 | 9/1998 |
| WO | WO 99/25470 | 5/1999 |
| WO | WO 99/32508 | 7/1999 |
| WO | WO 00/21658 | 4/2000 |
| WO | WO 01/60520 | 8/2001 |
| WO | WO 03/016868 | 2/2003 |
| WO | WO 03/031054 | 4/2003 |

OTHER PUBLICATIONS

Multiblock instrument user's manual (CSPS Pharmaceuticals; public availability date 1997).*
Lebl, "A New Approach to Automated Solid Phase Synthesis Based on Centrifugation of Titled Plates" *J. Assoc. Lab. Automation* (1998) 3(3): 59-61.

* cited by examiner

*Primary Examiner* — Christopher M Gross
(74) *Attorney, Agent, or Firm* — Knobbe Martens Olson & Bear LLP

(57) ABSTRACT

Disclosed herein are methods of method of making a substrate for performing a chemical synthesis reaction.

19 Claims, 5 Drawing Sheets

METHODS OF FORMING AND USING A SOLID-PHASE SUPPORT

CROSS-REFERENCE TO RELATED APPLICATIONS

This application is a division of U.S. patent application Ser. No. 10/651,568, entitled METHOD OF FORMING AND USING A SOLID-PHASE SUPPORT, filed Aug. 29, 2003, the disclosure of which is incorporated herein by reference in its entirety.

STATEMENT REGARDING FEDERALLY SPONSORED RESEARCH OR DEVELOPMENT

This invention was made with government support under National Institute of Health (NIH) Grant Number HG02805 awarded by Public Health Services (PSH). The government has certain rights in the invention.

BACKGROUND OF THE INVENTION

1. Field of the Invention

This invention relates, in general, to a solid-phase support for high-throughput synthesis, and more particularly to substrates having particles attached thereto, the solid-phase support being capable of withstanding centrifugal forces generated during high-throughput synthesis.

2. Description of Related Art

Solid-phase synthesis of organic molecules is the method of choice for preparation of libraries and compound megaarrays, which are currently being applied for screening in the quest to find new drugs or pharmaceutical lead compounds, i.e., compounds which exhibit a particular biological activity of pharmaceutical interest. These leads can serve as a starting point for the selection and synthesis of a drug compound, which in addition to the particular biological activity of interest have pharmacologic and toxicologic properties suitable for administration to animals, including humans.

Solid-phase synthesis requires repetitions of several relatively simple operations of addition of reagents, incubation and separation of liquid-phases. In solid-phase synthesis, final compounds are synthesized attached to solid-phase supports that permit the use of mechanical means to separate intermediate, partially-synthesized compounds between synthesis steps. Various designs of manual and automated instruments for combinatorial synthesis utilizing solid-phase synthesis have appeared in patent and non-patent literature. For example, U.S. Pat. Nos. 5,202,418 and 5,338,831, both to Lebl et al., each describe a method of performing multiple synthesis of peptides on a solid carrier. U.S. Pat. No. 5,342,585, also to Lebl et al., describes an apparatus for multiple syntheses of peptides on solid support. U.S. Pat. No. 6,045,755, also to Lebl, et al., describes an apparatus and a method for combinatorial chemistry synthesis. The entire contents of the above patents are incorporated herein by this reference.

Some known instruments have employed centrifugation for the separation of solid and liquid-phases in order to provide devices that are capable of high-throughput synthesis. Such devices can utilize solid-phase particles, for example, macrobeads or microbeads, as a solid-phase support to which intermediate and final compounds are attached. Such solid-phase particles are generally suspended within a reaction vessel, which reaction vessel is subjected to centrifugal forces to separate the liquid and solid-phases. For example, U.S. Pat. No. 6,121,054 to Lebl, describes a method for separation of liquid and solid-phases for solid-phase organic synthesis in which a slurry of beads are suspended in a solvent. Similarly, U.S. Patent Application Publication No. US 2002/0044894 A1 to Lebl et al. describes an oligonucleotide synthesizer that utilizes centrifugation to separate the liquid-phase from beads. Generally, such instruments employ mechanical means to retain the solid-phase beads within a reaction vessel, for example, a well of a microtiter plate, during centrifugation. The entire contents of the above patent and publication are incorporated herein by this reference.

One means to retain the solid-phase beads is to tilt the reaction vessel to form pockets from which the solid-phase cannot be removed by centrifugal force. See, e.g., U.S. Pat. No. 6,121,054. Alternatively, mesh or other frit materials can be employed to enclose and restrain the beads within the reaction vessel. See, e.g., U.S. Patent Application Publication No. US 2002/0044894 A1. Disadvantageously, such retention means increase the mechanical complexity of the instruments and/or the reaction vessels.

What is needed is a solid-phase support for high-throughput synthesis that overcomes the above and other disadvantages of known instruments employing solid-phase particles suspended within reaction vessels.

BRIEF SUMMARY OF THE INVENTION

In summary, one aspect of the present invention is directed to a method of forming a solid-phase support, the method including the steps of providing a substrate having a reaction vessel, dispensing a particle in the reaction vessel, and permanently bonding the particle in the substrate within the reaction vessel. The particle may include a microbead. The particle may include controlled pore glass. The dispensing step may include brushing the particle into a recess of a dispenser plate. The substrate may include a microtiter plate including a plurality of microtiter wells. The dispensing plate may include a plurality of the recesses and each of the microtiter the wells may define a respective reaction vessel that is aligned with a respective the recess. The dispensing step may further include contacting the dispensing plate and the microtiter plate such that the recess is aligned with the reaction vessel. The dispensing step may further include pivoting the dispensing plate into engagement with the microtiter plate. The dispensing step may further include providing a first dispensing pressure to the recess facilitating transfer of the particle from the recess to the reaction vessel.

In one embodiment, bonding can include embedding a particle in a substrate. Bonding can also include heating the substrate. The embedding step may further include heating the substrate, thereby increasing the temperature of a portion of the substrate, and in the case of multi-well plate at least a portion of each the reaction vessels, to the melting point of the substrate. The bonding step may further include providing a second bonding pressure to the reaction vessel biasing the particle against the reaction vessel. The bonding step may further include heating the substrate, thereby increasing the temperature of a portion of the substrate adjacent a bottom surface of each the reaction vessel to the melting point of the substrate. The bonding step may further include providing a second bonding pressure to the reaction vessel biasing the particle against the bottom of the reaction vessel. The method may include dispensing a plurality of the particles to the reaction vessel, thereby bonding one or more of the particles into the substrate within the reaction vessel. The one or more of the particles may remain nonbonded to the substrate. The method may further include the step of removing the one or more nonbonded particles from the reaction vessel. The providing step may include providing a bottomless-well plate and a rigid sheet, the method further including providing a layer of hot-melt adhesive to the rigid sheet to form a laminate sheet, applying the laminate sheet to a bottom surface of the bottomless-well plate thereby forming the substrate having a reaction vessel. The bonding step may include embedding the particle in the layer of hot-melt adhesive.

Another aspect of the present invention is directed to a method of synthesis including the steps of providing a solid-phase support including a particle bonded to the substrate adjacent a surface of substrate, the particle being functionalized to covalently attach an intermediate compound of a synthetic reaction, dispensing a liquid including a reagent to the solid-phase support to effect the synthetic reaction, and removing the liquid from the solid-phase support by centrifugation, whereby the intermediate compound remains attached to the substrate by the particle. The solidphase support may include a reaction vessel and wherein the particle may be bonded the substrate and in the reaction vessel. The solid-phase support may include a microtiter plate. The particle may include controlled pore glass. The providing step may include heating the substrate and bonding the particle in the substrate, thereby making the solid-phase support. The removing step may include centrifugation around an axis of rotation, wherein the surface of the substrate may be oriented away from the axis of rotation and wherein the particles may remain bonded in the surface. The particle may include 1400 Angstrom controlled pore glass.

A further aspect of the present invention is directed to a method of making a solid-phase support, including heating a substrate, thereby forming a molten substrate, contacting the molten substrate with a particle, and allowing the molten substrate to cool in the presence of the particle, thereby making a solid-phase support including the particle bonded in the substrate.

Yet another aspect of the present invention is directed to a method of separating a liquid and solid-phase, including providing a solid-phase support, the solid phase support including a particle embedded in a surface of a substrate, and removing the liquid from the solid-phase support by centrifugation around an axis of rotation, wherein the surface of the substrate may be oriented away from the axis of rotation and wherein the particles remain embedded in the surface.

An object of the present invention is to provide a method of forming and using a solid-phase support.

Another object of the present invention is to provide a substrate having a solid-phase support attached thereto, in which the substrate and support are capable of withstanding centrifugal forces generated during high-throughput synthesis.

Yet another object of the present invention is to provide a method of forming a substrate of the above character.

The solid-phase support of the present invention has other features and advantages which will be apparent from or are set forth in more detail in the accompanying drawings, which are incorporated in and form a part of this specification, and the following Detailed Description of the Invention, which together serve to explain the principles of the present invention.

DETAILED DESCRIPTION OF THE PREFERRED EMBODIMENT

Figure 1:
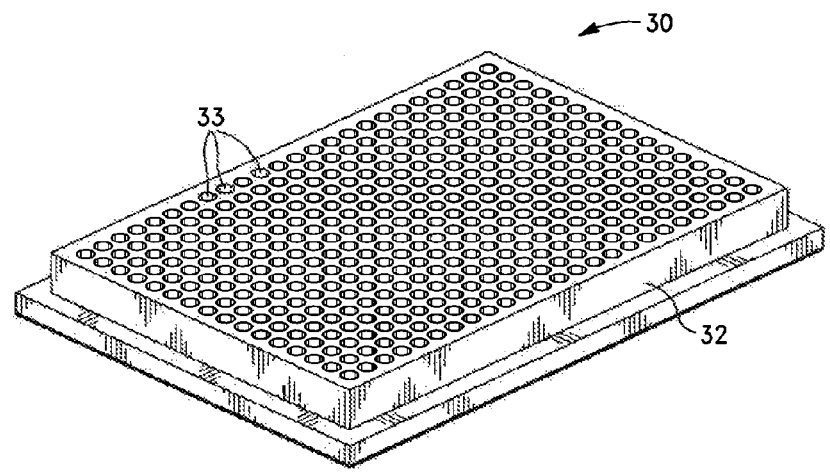
FIG. 1 is a perspective view of a solid-phase support for high-throughput synthesis in accordance with the present invention.

Reference will now be made in detail to particular embodiments of the invention, examples of which are illustrated in the accompanying drawings. While the invention will be described in conjunction with particular embodiments, it will be understood that they are not intended to limit the invention to those embodiments. On the contrary, the invention is intended to cover alternatives, modifications and equivalents, which can be included within the spirit and scope of the invention as defined by the appended claims.

The present invention is directed to a solid-phase support for separation of liquid and solid phase components of a two-phase system such as a synthetic or analytical system. A solid-phase support of the invention can be used for high-throughput synthesis including, but not limited to, solid-phase combinatorial chemistry synthesis of organic molecules. In particular, the present invention is directed to substrates particularly suited for separation of components using a centrifuge. For example, the substrates are particularly suited for use with high-throughput synthesis ("HTS") apparatus which utilize a centrifugal rotor assembly for the step-wise addition and removal of solid-phase and liquid-phase solutions, and the separation and removal of the solid-phase synthetic reactions, as is described in U.S. Pat. No. 6,121,054 to Lebl ("the Lebl '054 patent"), and in U.S. Patent Application Publication No. US 2002/0044894 A1 to Lebl et al. ("the Lebl '894 publication"), the entire contents of which patent and publication are incorporated by this reference. The present invention is also useful for other phase separation systems such as those based on removal of a liquid phase from a solid phase by pipetting or aspiration.

Accordingly, the invention provides a method of separating a liquid and solid-phase. The method includes the steps of (a) providing a solid-phase support having a particle embedded in a surface of a substrate; and (b) removing the liquid from the solid-phase support by centrifugation around an axis of rotation, wherein the surface of the substrate is oriented away from the axis of rotation and wherein the particles remain embedded in the surface.

By way of introduction, combinatorial chemistry synthesis protocols prescribe the stepwise, sequential addition of building blocks to intermediate and/or partially-synthesized intermediate compounds in order to synthesize a final compound. In solid-phase synthesis, final compounds are synthesized attached to solid-phase supports that permit the use of simple mechanical means to separate intermediate, partially-synthesized intermediate compounds between synthetic steps.

In a particular embodiment, a solid-phase support of the present invention is used to synthesize nucleic acids. By "nucleic acid" or "oligonucleotide" or grammatical equivalents herein means at least two nucleotides covalently linked together. A nucleic acid of the present invention will generally contain phosphodiester bonds, although in some cases, as outlined below, nucleic acid analogs are included that can have alternate backbones, comprising, for example, phosphoramide (Beaucage et al., Tetrahedron 49(10):1925 (1993) and references therein; Letsinger, J. Org. Chem. 35:3800 (1970); Sprinzl et al., Eur. J. Biochem. 81:579 (1977); Letsinger et al., Nucl. Acids Res. 14:3487 (1986); Sawai et al., Chem. Lett. 805 (1984), Letsinger et al., J. Am. Chem. Soc. 110:4470 (1988); and Pauwels et al., Chemica Scripta 26:141 91986)), phosphorothioate (Mag et al., Nucleic Acids Res. 19:1437 (1991); and U.S. Pat. No. 5,644,048), phosphorodithioate (Briu et al., J. Am. Chem. Soc. 111:2321 (1989), O-methylphophoroamidite linkages (see Eckstein, Oligonucleotides and Analogues: A Practical Approach, Oxford University Press), and peptide nucleic acid backbones and linkages (see Egholm, J. Am. Chem. Soc. 114:1895 (1992); Meier et al., Chem. Int. Ed. Engi. 31:1008 (1992); Nielsen, Nature, 365:566 (1993); Carlsson et al., Nature 380:207 (1996), all of which are incorporated by reference). Other analog nucleic acids include those with positive backbones (Denpcy et al., Proc. Natl. Acad. Sci. USA 92:6097 (1995); non-ionic backbones (U.S. Pat. Nos. 5,386,023, 5,637,684, 5,602,240, 5,216,141 and 4,469,863; Kiedrowski et al., Angew. Chem. Intl. Ed. English 30:423 (1991); Letsinger et al., J. Am. Chem. Soc. 110:4470 (1988); Letsinger et al., Nucleoside & Nucleotide 13:1597 (1994); Chapters 2 and 3, ASC Symposium Series 580, "Carbohydrate Modifications in Antisense Research", Ed. Y. S. Sanghui and P. Dan Cook; Mesmaeker et al., Bioorganic & Medicinal Chem. Lett. 4:395 (1994); Jeffs et al., J. Biomolecular NMR 34:17 (1994); Tetrahedron Lett. 37:743 (1996)) and nonribose backbones, including those described in U.S. Pat. Nos. 5,235,033 and 5,034,506, and Chapters 6 and 7, ASC Symposium Series 580, "Carbohydrate Modifications in Antisense Research", Ed. Y. S. Sanghui and P. Dan Cook. Nucleic acids containing one or more carbocyclic sugars are also included within the definition of nucleic acids (see Jenkins et al., Chem. Soc. Rev. (1995) pp 169-176). Several nucleic acid analogs are described in Rawls, C & E News Jun. 2, 1997 page 35. All of these references are hereby expressly incorporated by reference. These modifications of the ribose-phosphate backbone can be done to increase the stability and half-life of such molecules in physiological environments.

The nucleic acids (sometimes referred to herein as oligonucleotides) can be synthesized using a variety of possible synthetic reactions. In a particular embodiment, phosphoramidite chemistry is used, with enzymatic techniques and techniques based on photodeprotection useful as well. In addition, any number of nucleic acid analogs and labeled nucleic acids can be made and used. See for example Oligonucleotides and Analogs: A Practical Approach, Ed. F. Eckstein, IRL Press, 1991, hereby incorporated by reference in its entirety.

An exemplary solid-phase combinatorial protocol is that for the synthesis of peptides attached to polymer resin, which proceeds according to Lam et al., 1991, A new type of synthetic peptide library for identifying ligand-binding activity, Nature 354:82-84. U.S. Pat. No. 5,510,240 to Lam et al. for Method of screening a peptide library; Lam et al., 1994, Selectide technology: Bead-binding screening. Methods: Companion to Methods in Enzymology 6:372-380. Another exemplary protocol is that for the synthesis of benzodiazepine moieties, which proceeds according to Bunin et al., 1992, A general and expedient method for the solid phase synthesis of 1,4-benzodiazepine derivatives, J. Amer. Chem. Soc., 114: 10997-10998. U.S. Pat. No. 5,288,514 to Ellman for Solid phase and combinatorial synthesis of benzodiazepine compounds on a solid support. Also, for protocols for the addition of N-substituted glycines to form peptoids, see, e.g., Simon, et al., 1992, Peptoids: A modular approach to drug discovery. Proc. Natl, Acad. Sci. USA, 89:9367-9371; Zuckermann et al., 1992, Efficient method for the preparation of peptoids [oligo(N-substituted glycines)] by submonomer solid-phase synthesis. J. Amer. Chem. Soc., 114:10646-10647; WO PCT94/06,451 to Moos et al. for Synthesis of N-substituted polyamide monomers, useful as solvents, additives for food, enzyme inhibitors etc. Approaches for synthesis of small molecular libraries were recently reviewed by, e.g., Krchnak and Lebl, 1996, Synthetic library techniques: Subjective (biased and generic) thoughts and views, Molecular Diversity, 1:193-216; Ellman, 1996, Design, synthesis, and evaluation of small-molecule libraries, Account. Chem. Res., 29: 132-143; Armstrong et al., 1996, Multiple-component condensation strategies for combinatorial library synthesis, Account. Chem. Res., 29:123-131.; Fruchtel et al., 1996, Organic chemistry on solid supports, Angew. Chem. Int. Ed., 35:17-42; Thompson et al., 1996, Synthesis and application of small molecule libraries, Chem. Rev., 96:555-600; Rinnova et al., 1996, Molecular diversity and libraries of structures: Synthesis and screening, Collect. Czech. Chem. Commun., 61: 171-231; Hermkens et al., 1996, Solid-phase organic reactions: A review of the recent literature, Tetrahedron, 52:4527-4554. Exemplary building blocks and reagents are amino acids, other organic acids, aldehydes, alcohols, and so forth, as well as bifunctional compounds, such as those given in Krchnak and Lebl, 1996, Synthetic library techniques: Subjective (biased and generic) thoughts and views, Molecular Diversity, 1:193-216. All of these references are hereby expressly incorporated by reference.

In one embodiment, peptides are synthesized. By "peptide" herein is meant at least two amino acids joined via a peptide bond. The peptide may be made up of naturally occurring amino acids and peptide bonds, or synthetic peptidomimetic structures. The side chains may be in either the (R) or the (S) configuration. In the preferred embodiment, the amino acids are in the (S) or L-configuration. If nonnaturally occurring side chains are used, non-amino acid substituents may be used, for example to prevent or retard in vivo degradations. The stepwise solid phase synthesis of peptides is well known. An exemplary solid-phase combinatorial protocol is that for the synthesis of peptides attached to polymer resin, which proceeds according to Lam et al., 1991, Nature 354:82-84; U.S. Pat. No. 5,510,240; Lam et al., 1994, Selectide technology: Bead-binding screening. Methods: A Companion to Methods in Enzymology 6:372-380. Another exemplary protocol is that for the synthesis of benzodiazepine moieties, which proceeds according to Bunin et al., 1992, J. Amer. Chem. Soc., 114:10997-10998 and U.S. Pat. No. 5,288,514. Also, for protocols for the addition of N-substituted glycines to form peptoids, see, e.g., Simon, et al., 1992, Proc. Natl. Acad. Sci. USA, 89:9367-9371; Zuckermann et al., 1992, J. Arner. Chem. Soc., 114:10646-10647; WO PCT94/06,451 to Moos et al.; Approaches for synthesis of small molecular libraries were recently reviewed by, e.g., Krchnak and Lebl, 1996, Molecular Diversity, 1:193-216; Ellman, 1996, Account. Chem. Res., 29:132-143; Armstrong et al., 1996, Account. Chem. Res., 29:123-131.; Fruchtel et al., 1996, Anaew. Chem. Int. Ed., 35: 17-42; Thompson et al., 1996, Chem. Rev., 96:555-600; Rinnova et al., 1996, Collect. Czech. Chem. Commun., 61: 171-231; Hermkens et al., 1996, Tetrahedron, 52:4527-4554. All of these references are hereby expressly incorporated by reference.

One should appreciate however that a solid-phase support of the present invention is similarly applicable to other chemical protocols having similar functional steps. For example, components of the present invention can be applied to appropriate liquid-phase, combinatorial chemistry synthesis protocols, to other solidor liquid-phase chemical protocols, or to any combination thereof. Such synthesis protocols include, but are not limited to organic syntheses such as peptide synthesis, polymer synthesis, and small molecule synthesis.

A solid-phase support of the invention can also be used for an analytical system in which it is desired to separate a liquid-phase from a solid-phase. Exemplary analytical systems include, without limitation, a binding assay such as an assay for detecting nucleic acid hybridization, binding of a protein to a ligand, binding of an antibody to an epitope, binding of a cell to another cell, binding of a molecule to a cell or subcellular component or binding between cells or subcellular components; an enzyme activity assay such as a kinetic assay or inhibition assay; or a cellular activity assay such as detection of response of a cell to a particular molecule.

The invention provides a method of making a solid-phase support. The method includes the steps of (a) heating a substrate, thereby forming a molten substrate; (b) contacting the molten substrate with a particle; and (c) allowing the molten substrate to cool in the presence of the particle, thereby making a solid-phase support having the particle embedded in the substrate.

As used herein the term "molten" is intended to mean transformed from a solid state to a state that is at least partially liquid. A molten substrate can be one that is converted from a solid state to a fully liquid state or to a state that is partially liquid. A molten substrate in a partially liquid state includes, for example, a substrate that has a liquid surface and solid core. A substrate can be transformed from a solid state to a liquid state, for example, by application of heat, pressure, chemical agents or a combination thereof.

As used herein, the term "embedded" is intended to mean placed at least partially within a substrate, thereby interrupting the surface of the substrate. In accordance with the invention, a particle embedded in a substrate can be fully or partially surrounded by the substrate, so long as the particle interrupts the surface of the substrate and can be accessed by a liquid applied to the surface of the substrate.

Turning now to the drawings, wherein like components are designated by like reference numerals throughout the various figures, attention is directed to FIG. 1, which illustrates a solid-phase support for high-throughput synthesis, generally designated by the numeral 30. In accordance with the present invention, one or more particles 31 are securely attached to a substrate 32 thus enabling the use of the particles in apparatus which utilize centrifuge technology to separate the liquid-phase from the solid-phase such as those used for high-throughput synthesis ("HTS").

As used herein, the term "substrate" is intended to mean a material capable of forming a solid base. A material included in the term can have any of a variety of properties depending upon the desired application of the invention including for example, porous, nonporous, rigid, elastic, pliable, malleable, low temperature melting, high temperature melting, and/or chemically resistant to one or more solvents commonly used in the reactions set forth herein. The substrate can be formed of a variety of materials including, but not limited to, plastic; polypropylene, polyethylene, polybutylene, polyurethane, nylon, polymer such as acrylic, acrylonitrile butadiene styrene (ABS), ULTEM (Polyetherimide), acetal copolymer, PROPYLUX HS (heat stabilized polypropylene), RADEL A (polyethersulfone), RADEL R (polyarylethersulfone), UDEL (polysulfone), NORYL PPO (polyphenylene oxide & styrene), Polycarbonate, UHMW-PE (ultra high molecular weight polyethylene), Polyetheretherketone (PEEK), polyphenylene sulfide (PPS, TECHTRON or RYTON), polyolefin or polystyrene; metal such as aluminum, iron, steel or an alloy; other materials such as glass or silicon, or derivatives or combinations of these or other suitable materials. The material of the substrate is typically formed of a material that is capable of achieving a state wherein it is malleable or pliable such that particles can be bonded to it, as discussed below. The material of the substrate can also be in a state where it is rigid such that it can withstand forces applied during synthetic or analytical processes. As set forth below, substrates useful in the invention include, for example, those that can be heated to a molten state that is malleable or pliable such that when loaded with particles and cooled to a rigid state a solid-phase substrate is formed.

Substrate 32 can include one or more reaction vessels or wells 33. One or more particles 31 can be disposed within each well 33 and affixed to substrate 32. Such configuration allows synthetic reactions to be performed within one or more wells of the substrate. In particular, liquid reagents can be added to each well, reacted within each well, and then the residual liquid can be removed from each well, for example, via centrifugation, inversion of the wells, and/or aspiration. In one embodiment, the substrate is a multi-well plate that includes a plurality of wells disposed in arrays. Exemplary multi-well plates include, for example, microplates, microtiter plates or n-well plates where "n" is the number of wells including, for example, 8, 16, 96, 384 or 1536-wells. As used herein, the term "microplate" is intended to mean a multi-well plate that has dimensions and properties consistent with the definition provided by the Society for Biomolecular Screening (Danbury, Conn., USA).

One will appreciate that the substrate and the wells can be configured in a variety of ways. The shape of the wells can vary depending on the particular application and/or desired fluid dynamics. For example, the depth and diameter of the wells can be U-shaped, V-shaped, or flat bottomed. The wells can be substantially vertical, inclined inwardly (e.g., toward a centrifugal axis) and/or inclined outwardly (e.g., away from a centrifugal axis). Furthermore, the sidewall of the well can be cylindrical, conical, flat, tapered inwardly or outwardly, or have any other desired geometry. One should also appreciate that the shape of the substrate itself can also vary. For example, the shape of the substrate can be polygonal (e.g., rectangular), regular, irregular, arcuate or round.

As noted above, one or more particles can be affixed to the substrate within each well. The particles can be embedded into the substrate while the substrate is heated to an elevated temperature approximating the melting point of the substrate.

Figure 2:
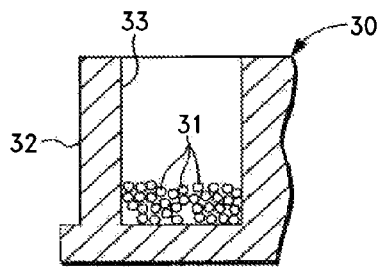
FIG. 2 is an enlarged, fragmented, cross-sectional view of the solid-phase support of FIG. 1 schematically illustrating particles disposed in the well of the substrate prior to bonding of the particles to the substrate.
Figure 3:
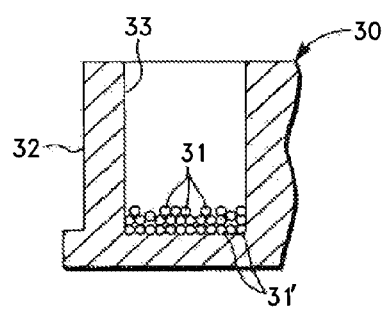
FIG. 3 is an enlarged, fragmented, cross-sectional view of the solid-phase support of FIG. 1 schematically illustrating particles disposed in the well of the substrate following bonding but prior to removal of excess particles from the well.
Figure 4:
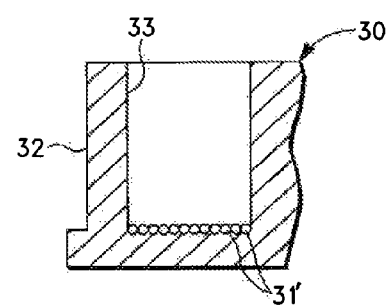
FIG. 4 is an enlarged, fragmented, cross-sectional view of the solid-phase support of FIG. 1 schematically illustrating particles bonded to the well of the substrate.

In particular embodiments, external mechanical pressure can be applied to the particles while the substrate is heated. Alternatively, embedding can be allowed to occur due to gravity in the absence of externally applied mechanical pressure. As the substrate cools, the particles will typically be permanently bonded to the substrate, which bond is capable of withstanding forces typically used to remove liquids such as centrifugal force, aspiration, vacuum, or gravity. Alternatively, a particle can be adhesively bonded to the internal surface of the well utilizing a thermoplastic material having a relatively low melting point (i.e., lower than that of the substrate), a two-part epoxy, and/or other suitable means. One or more particles can be bonded to a well bottom as exemplified in FIG. 2 through FIG. 4. Those skilled in the art will recognize that particles can be bonded to all or part of a well surface including, without limitation, the bottom, sides, subsections thereof or combinations thereof.

Accordingly, the invention provides a solid-phase support having a particle bonded to a substrate capable of withstanding centrifugal forces directed opposite the surface of the substrate to which the particle is bonded including, for example, centrifugal forces of at least about 10×g, 100×g, 500×g, 1,000×g, 5,000×g, 10,000×g, or 100,000×g.

Although the invention has been exemplified above with particles bonded to wells, those skilled in the art will recognize that a solid-phase support useful in the invention need not include wells. For example, a solid-phase substrate of the invention can include a flat or planar substrate to which particles are bonded. Alternatively, particles can be bonded to a raised area of a substrate or protrusion. For example, particles can be bonded to protruding "pins" that are configured in an array having dimensions similar to a microtiter plate such that the pins can be dipped into a microtiter plate for delivery of synthetic reactants or analytical reagents. An array of pins can be centrifuged or aspirated to remove liquid from the bonded beads using methods similar to those exemplified herein with respect to microtiter platebased solid-phase supports.

As used herein, the term "particle" is also intended to mean a substance having a size or diameter small enough to fit within the area of a substrate to which it is bonded. Exemplary particles include, without limitation, a "microparticle" or "nanoparticle" or "bead" or "microbead" or "microsphere." Particles useful in the invention include, for example, beads such as microbeads measuring 30 microns to 300 microns in diameter and/or macrobeads measuring larger than 300 microns in diameter. A particle can be made of glass, plastic, polystyrene, resin, gel, agarose, sepharose, and/or other suitable materials.

Typically, particles will have a melting temperature that is higher than that of the substrate to which they are being bonded when the bonding method includes melting of the substrate. In particular embodiments, a low-melting-point polymer can be placed in contact with particles and a substrate to which they are to be bonded, thus providing an adhesive. There are other types of beads on which chemical synthesis can be performed, which can also be used in the invention.

In particular embodiments, a particle can be controlled pore glass ("CPG"). CPG having any of a variety of particle sizes and pore sizes can be used in the invention including, for example, CPG with a median particle size falling within about 37 to 177 microns and a median pore size falling within about 65 to 3300 Angstroms. A particularly useful CPG has a median particle size and pore size of about 100 microns and about 1400 Angstroms, respectively. Those skilled in the art will recognize that CPG is typically obtained with a median particle size specification and there can be variation within a lot. For example, a lot of 100-micron CPG can include members be as small as about 75 or as large as about 125 microns. It will be understood that the above described ranges, as with all ranges described herein, are intended to include individual integer and non integer values therein.

CPG can have a surface modification or it can be unmodified. Unmodified CPG is typically used as a porous bed material in chromatography columns. Its surface can be derivatized to provide reactive functional groups for synthesis using surface modifications methods known in the art.

A particle can be functionalized in order to covalently attach molecules, cells, other particles or other materials. Exemplary molecules that can be attached include intermediate compounds (or final compounds) of a synthetic reaction. As will be appreciated by those in the art, functionalization of a particle will depend on the synthetic reactions to be performed, The functionalization of solid support surfaces such as certain polymers with chemically reactive groups such as thiols, amines, carboxyls, etc. is generally known in the art. Some examples of these surface chemistries for subsequent addition of building blocks during synthetic reactions include, but are not limited to, amino groups including aliphatic and aromatic amines, carboxylic acids, aldehydes, amides, chloromethyl groups, hydrazide, hydroxyl groups, sulfonates and phosphates.

These functional groups can be used to add any number of different building block moieties to the particles, generally using known chemistries, including, but not limited to the use of amino-functionalized supports, sulfhydryl linkers, etc. There are a number of sulfhydryl reactive linkers known in the art such as SPDP, maleimides, o-haloacetyls, and pyridyl disulfides (see for example the 1994 Pierce Chemical Company catalog, technical section on cross-linkers, pages 155-200, incorporated herein by reference). Similarly, amino groups on the building blocks and on the surface can be attached using linkers; for example, a large number of stable bifunctional groups are well known in the art, including homobifunctional and heterobifunctional linkers (see Pierce Catalog and Handbook, pages 155-200). In an additional embodiment, carboxyl groups (either from the surface or from the building block) can be derivatized using well-known linkers (see the Pierce catalog). For example, carbodiimides activate carboxyl groups for attack by good nucleophiles such as amines (see Torchilin et al., Critical Rev. Therapeutic Drug Carrier Systems, 7(4):275-308 (1991), expressly incorporated herein). In addition, useful methods include systems that allow post-synthesis cleavage from the reaction vessels.

Figure 12:
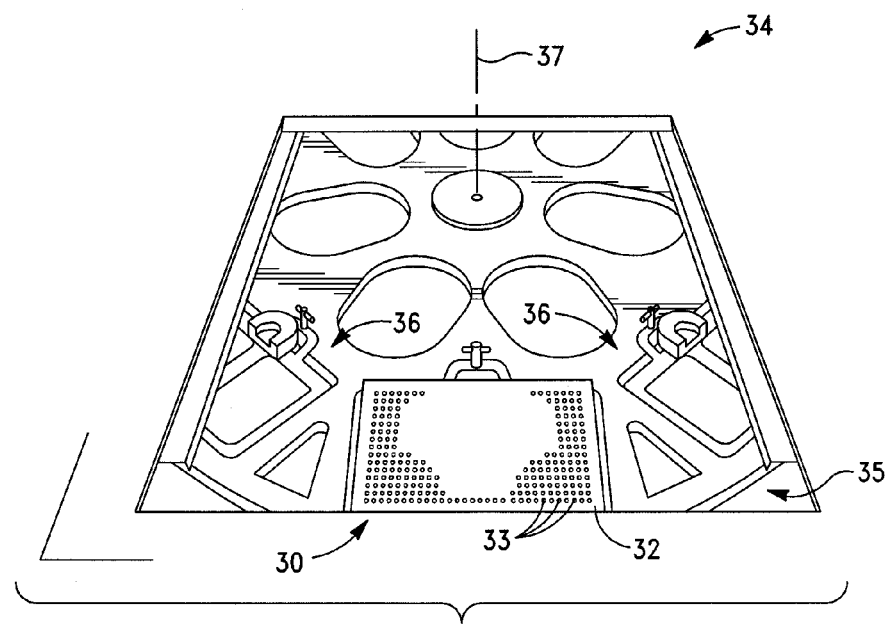
FIG. 12 is a perspective view of the solid-phase support of FIG. 1 mounted on rotor assembly of a high-throughput synthesis apparatus.

The configuration of the particles affixed to the substrate in accordance with the present invention allows the use of solid-phase support 32 with methods that utilize centrifuges for liquid-phase and solid-phase separation, such as the ones described by the Lebl '054 patent, and with apparatus that utilize centrifugal rotors for liquid-phase and solid-phase separation, such as the ones described by the Lebl '894 publication. For example, FIG. 12 illustrates a solid-phase support mounted on an apparatus 34 similar to that described in the Lebl '894 publication, which apparatus is configured for high-throughput, multi-protocol combinatorial syntheses. The apparatus includes a rotor assembly 35 for rotatably supporting one or more solidphase supports. Preferably, the rotor assembly includes a plate holder 36 that releasably secures the solid-phase support to the rotor assembly.

Rotor assembly 35 is supported for rotation about a centrifugal axis 37 which extends substantially vertically. Apparatus 34 also includes a motor drivingly connected to rotor assembly 35 in order to spin the rotor assembly for centrifugation in a manner similar to that described in the Lebl '894 publication. Apparatus 34 is adapted for synthesizing oligomers in each of a plurality of the reaction vessels disposed in the substrate. Thusly, the apparatus can also be equipped with a liquid delivery system (not shown) that is capable of delivering one or more liquids to one or more wells of the microtiter plate, in a manner similar to that also described in the Lebl '894 publication. In addition to the components mentioned above, the apparatus can also comprise additional components. For example, the centrifuge can comprise a sensor to signal the computer and liquid distribution system when a set of reaction vessels is in a particular orientation, and a motor to rotate the rotor into the correct orientation for liquid delivery, also in control of the computer. Furthermore, in the case of adjustable tilt rotors, the centrifuge can utilize a control and a sensor to control the degree of tilt.

Turning now to centrifugation and liquid-phase removal, rotor assembly 35 typically is activated to centrifuge the solid-phase support, exemplified in the illustrated embodiment, microtiter plates 32. The microtiter plates can be held in a fixed angle with respect to the rotor and with respect to vertical, as described in U.S. Pat. No. 6,045,755 to Lebl et al. ("the Lebl '755 patent"), the entire contents of which patent is incorporated herein by this reference, as well as the Lebl '054 patent. Alternatively, the microtiter plates can be dynamically adjusted such that the angle of the microtiter plates varies during centrifugation, as described in the Lebl '894 publication.

As particles are permanently affixed to the substrate in accordance with the present invention, the solid-phase support can be centrifuged in any of a variety of orientations. For example, solid-phase support 32 allows a "zero-tilt" centrifugation, that is, centrifugal removal of the liquid-phase from microtiter plates that are horizontally oriented during centrifugation. Accordingly, the solid-phase support of the present invention need not be tilted in such a manner to create "pockets" within the wells to retain the particles, namely because particles are securely attached to the substrate. Since particles are bonded to the substrate, a solid-phase substrate of the invention can be centrifuged in a reverse-tilt orientation in which the opening of a reaction vessel is oriented away from the axis of rotation. Thus, substantially all of the liquid in the vessel can be expelled due to centrifugation, while the bonded particles are maintained in the vessel. Furthermore, a solid-phase support of the invention need not have vessels with walls for containing particles or liquid-phase during centrifugation. Thus, particles can be attached to a portion of a substrate that is not in a vessel such as on a flat surface or on a protruding feature. The solid-phase supports of the present invention beneficially allow for the use of less complex highthroughput synthesizers, for example, by reducing the number of components of the rotor assembly, and simplifying the maintenance of the rotor assembly.

A method of forming solid-phase support 32, in accordance with the present invention, will now be described. In one embodiment, solid-phase particles in the form of controlled pore glass ("CPG") are bonded to the well bottoms of the substrate. For example, the method of the present invention can be utilized to bond a relatively equal amount of 1000 or 1400 Angstrom CPG to the bottom well surfaces of a 384-well polypropylene microtiter plate, for example, 384-well plates of the type sold by Robbins Scientific of Sunnyvale, Calif.

In a particular embodiment, approximately one to three grams of CPG can be initially applied to each microtiter plate and approximately 0.2 mg per well is bonded to the substrate. Preferably, the well is overloaded with CPG, that is, more CPG is provided in each well than is necessary to cover the bottom surface of the well. Not all of the CPG will be bonded to the plate, however, most of the excess non-bonded CPG is recoverable, as will become apparent below. One will appreciate that the actual amount of CPG, or other particle used will vary depending upon various factors including, but not limited to, the geometry, size and number of the wells present in the substrate. Accordingly, an amount of particles that overload a well or other area of a substrate or, alternatively, an amount of particles that sparsely load or load only a portion of a well or other area of a substrate can be applied.

Figure 5:
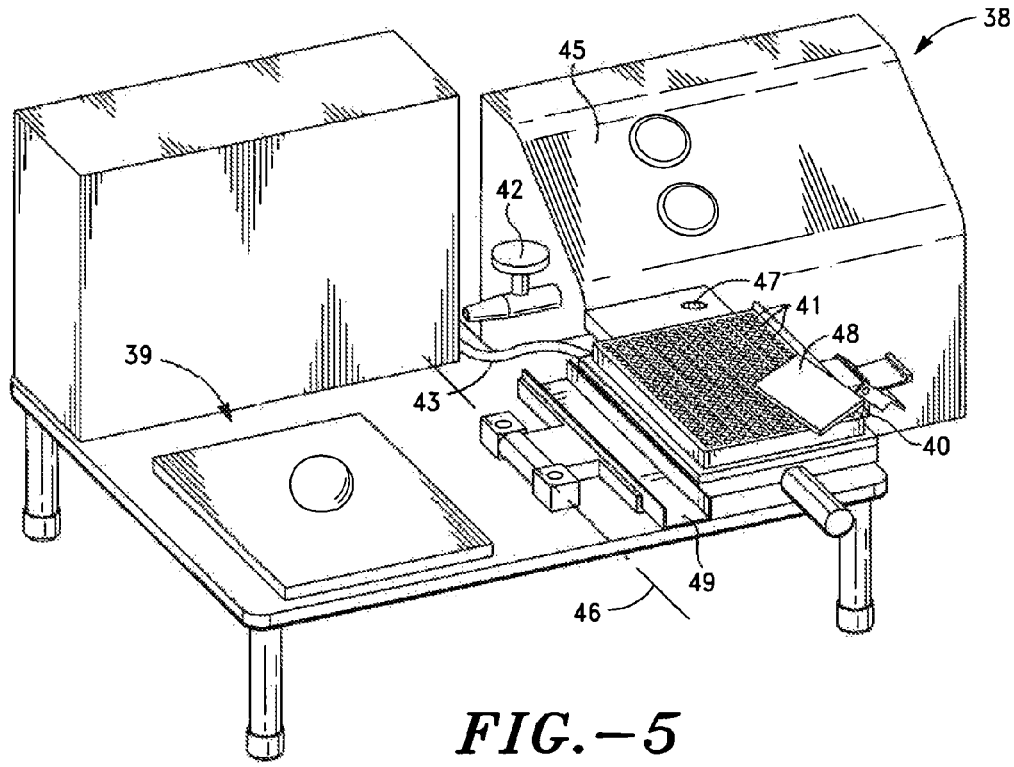
FIG. 5 is a schematic view of a workstation for applying particles to a substrate, which figure shows particles which have been loaded on an applicator.

Turning now to FIG. 5, the method of the present invention can be performed at a workstation 38 which includes a heating assembly 39 for warming the substrate and a solid-phase particle applicator 40 for dispensing and applying the solid-phase particles to the substrate. In a particular embodiment, the applicator is complementary in shape to substrate 32, and in the embodiment illustrated in FIG. 5, has an array of recesses 41 that correspond to the arrangement of wells 33 of a 384-well microtiter plate.

Recesses 41 are fluidly connected to a vacuum source 42 for generating a negative pressure within the recesses, which negative pressure facilitates loading CPG into the recesses and temporarily restraining the CPG within the recesses, as will become apparent below. Preferably, the bottoms of the recesses, which are fluidly connected to the vacuum source, are lined with a filter mesh or frit material to retain the CPG within the recesses. Recesses 41 of the applicator are also fluidly connected to a pressurized fluid source 43 that supplies fluid into the recesses and generates a fluid pressure for dispensing the CPG from recesses 41 into wells 33 when applicator 40 is positioned over substrate 32, as well become apparent below. Applicator 40 further includes a pressure plate assembly 44 that is also fluidly connected to pressurized fluid source 43 and is configured to bias substrate 32 against heating assembly 39 the applicator is positioned over the substrate. In one embodiment, pressure plate assembly 44 is a single-acting cylinder assembly that is configured to seat against and bias substrate 32 when a bonding pressure is supplied to the pressure plate assembly. A control unit 45 is provided which is used to control the temperature of heating assembly 39, activation of vacuum source 42, as well as the dispensing and bonding pressures of applicator 40. Preferably, the pressurized fluid source is compressed air, however, one will appreciate that other pressurized fluids can be used.

In one embodiment, the control unit is adjusted to set the heating assembly at a desired temperature, that is, the approximate melting point of the substrate material. In the illustrated embodiment, the heating assembly is set to approximately 235° C. to 240° C., however, one will appreciate that the desired temperature will vary depending upon the melting point of the particular substrate and particles being used. An infrared thermometer or other suitable means can be utilized to measure the true temperature of the heating assembly immediately adjacent the substrate such as the microtiter plate exemplified in FIG. 5. In the illustrated embodiment, the true temperature is approximately 270° C. (+/−5° C.). Again, one will appreciate that the actual temperature can vary depending upon various factors, including the material of the microtiter plate and/or the configuration of the heating assembly.

Next, control unit can 45 be adjusted to set the desired vacuum as well as the desired "Dispense" and "Bond" pressures of the applicator. In one embodiment, the vacuum is set to approximately 20 SCFH, the dispense pressure is set to approximately 30 psi and the bond pressure to approximately 60 psi, however, one will appreciate that the actual vacuum and pressures necessary will vary depending upon various factors including, but not limited to, the configuration and materials of the substrate.

Figure 6:
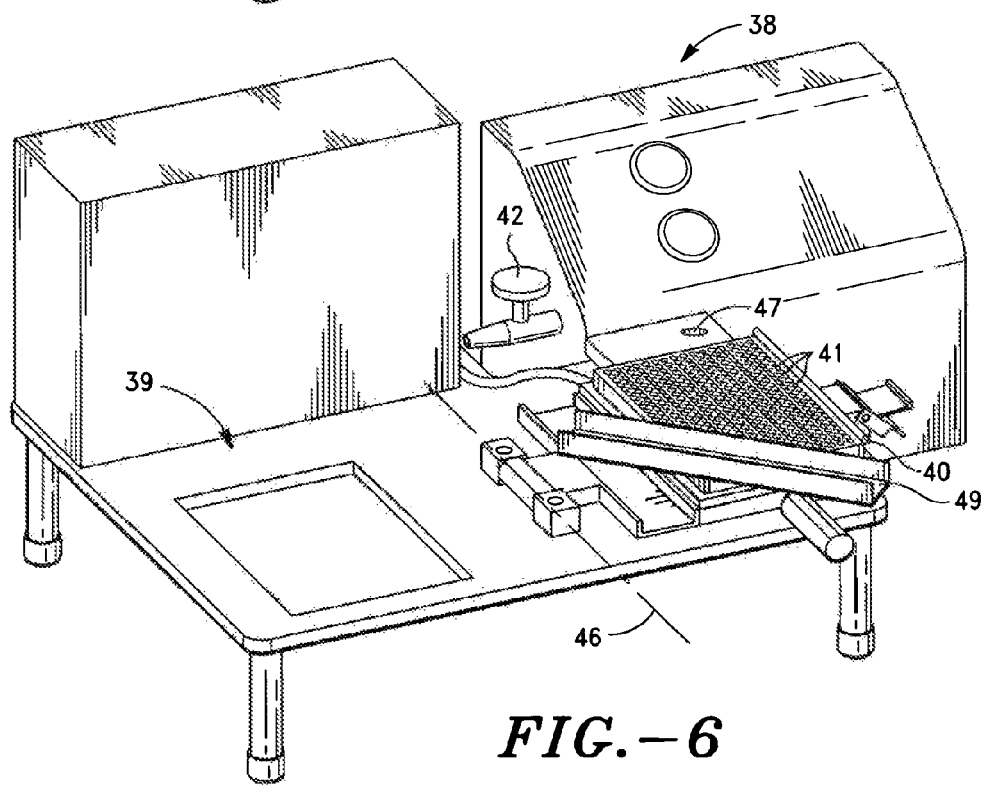
FIG. 6 is a schematic view of the workstation of FIG. 5 in which a reclaim tray has been disengaged from the applicator.
Figure 8:
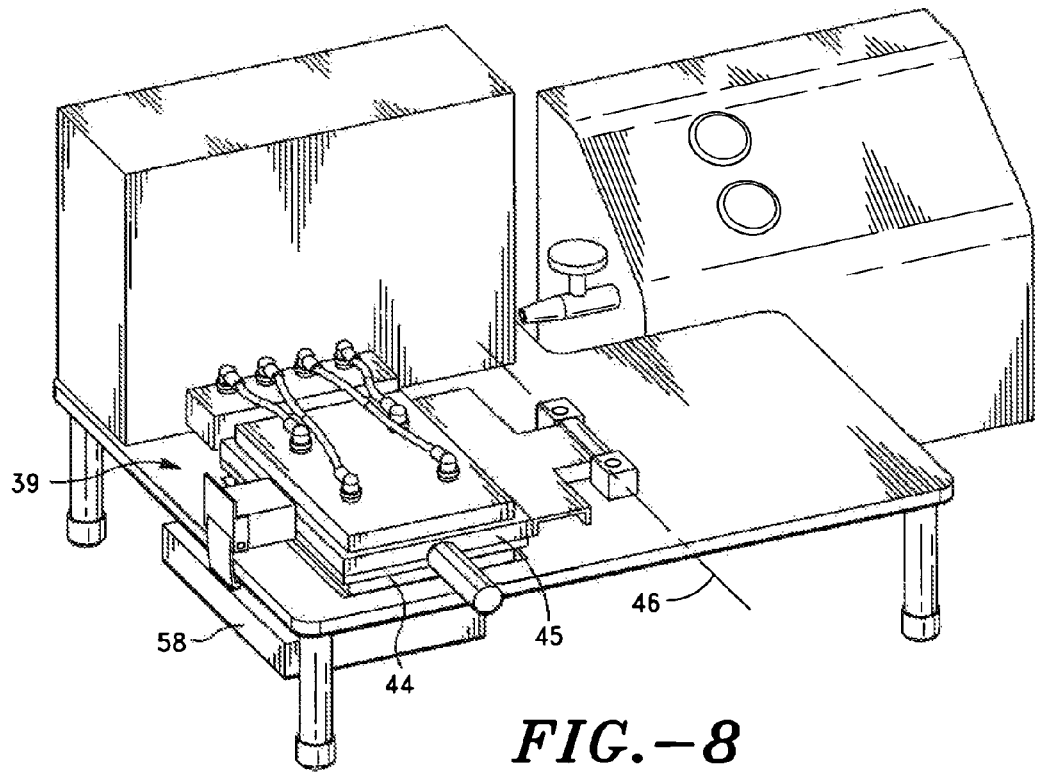
FIG. 8 is a schematic view of the workstation of FIG. 5 in which the applicator has been pivoted from a loading position to a bonding position resting against the substrate.

In the illustrated embodiment, applicator 40 is pivotally mounted on the workstation and located immediately adjacent heating assembly 39. Applicator 40 pivots about a pivot axis 46 between a first loading position (FIG. 5) and a second bonding position (FIG. 8). Such a pivotal configuration readily allows CPG to be loaded on a dispenser plate 47 of the applicator in the loading position. By way of example, approximately one to three grams of CPG can be poured onto the dispenser plate and thoroughly spread over the recesses of the dispenser plate with a foam brush 48 or other suitable means. Excess CPG can be brushed from the dispenser plate into a CPG reclaim tray 49 with the foam brush (FIG. 5), thus minimizing waste of CPG. The reclaim tray can then be removed (FIG. 6) and the excess CPG can be placed in a reclaim container 50 for later use.

The amount of particles adhered to a substrate can be influenced by altering any of a variety of conditions used for bonding. Exemplary conditions that can be varied to alter particle bonding include, without limitation, the amount of time the substrate is heated, the amount of pressure applied to the particles and substrate or a combination thereof. In a particular embodiment, a polypropylene microtiter plate can be heated to its melting point for about 20 to 40 seconds and CPG pressed with sufficient force to deform well depth by about 0.02 to 0.125 inches.

Figure 7:
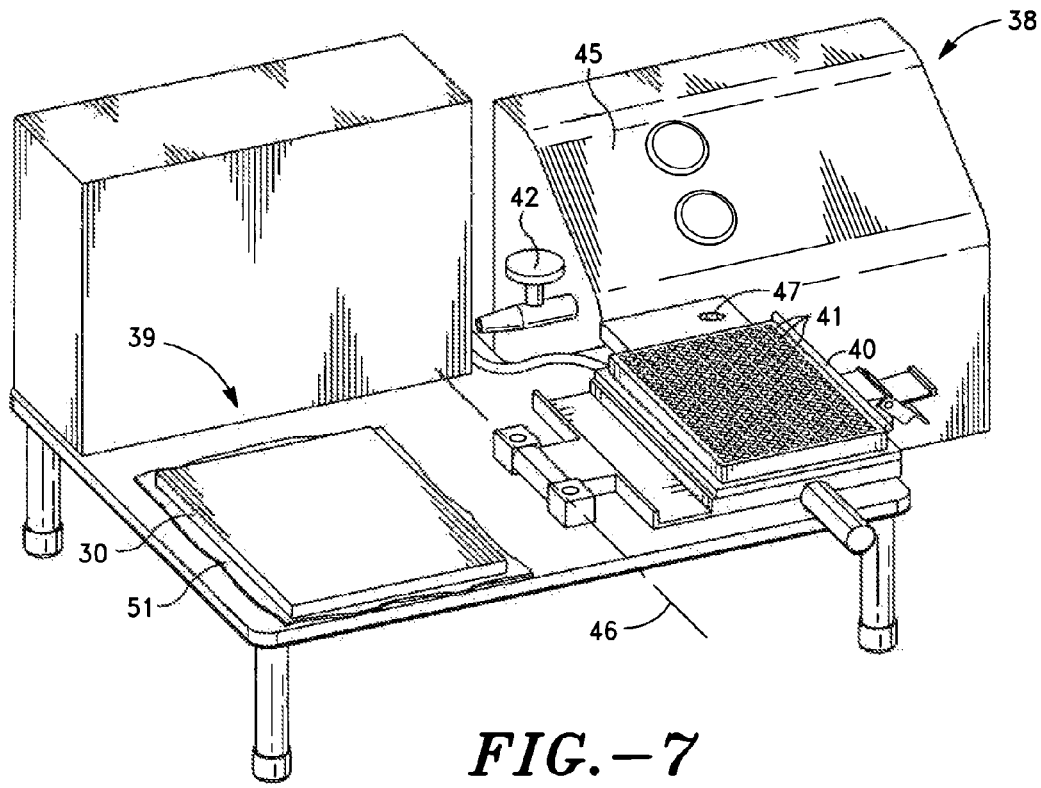
FIG. 7 is a schematic view of the workstation of FIG. 5 in which a substrate has been mounted on a heating element.

As shown in FIG. 7, a release sheet 51 can be placed on the heating assembly in order to facilitate removal of the microtiter plate from the heating assembly after bonding has taken place. In one embodiment, a sheet of aluminum foil is placed on the heating element, however, one will appreciate that other suitable means can be used. Next, a microtiter plate can be placed on the heating element, as well as the release sheet in the event that one is used.

With microtiter plate 32 in place on heating assembly 39, applicator 40 can be pivoted from its loading position to the bonding position and latched in place, as shown in FIG. 8. The vacuum within recesses 41 applied by vacuum source 42 facilitate restraint of the CPG within the recesses when the applicator is pivoted and latched in place. In one embodiment, the control unit is activated causing the dispensing and bonding cycle to commence. First, control unit 45 will terminate the vacuum allowing the CPG to fall under the force of gravity from recesses 41 into wells 33. The control unit may further activate the dispensing pressure to further facilitate travel of the CPG from the recesses of the dispensing plate into the wells of the microtiter plate. Meanwhile, a hot plate 52 can move upwardly and immediately adjacent microtiter plate 32 in order to heat the bottom of the microtiter plate, and particularly, the bottom surfaces of wells 33 to a temperature approximating the melting point of the material of the microtiter plate. At this time, the control unit can be used to increase the fluid pressure within the pressure plate assembly 44 thus firmly seating the pressure plate assembly on the microtiter plate 32 and biasing the microtiter plate downwardly against the heating assembly to facilitate heating of the microtiter plate.

When the temperature of the substrate material adjacent the well bottoms increases, the well bottoms become malleable and pliable. Once the well bottoms are warm and pliable, CPG 31 is embedded into the bottoms of wells 33 under the force of gravity and bonded with microtiter plate 32, thus permanently bonding the CPG to the microtiter plate.

Figure 11:
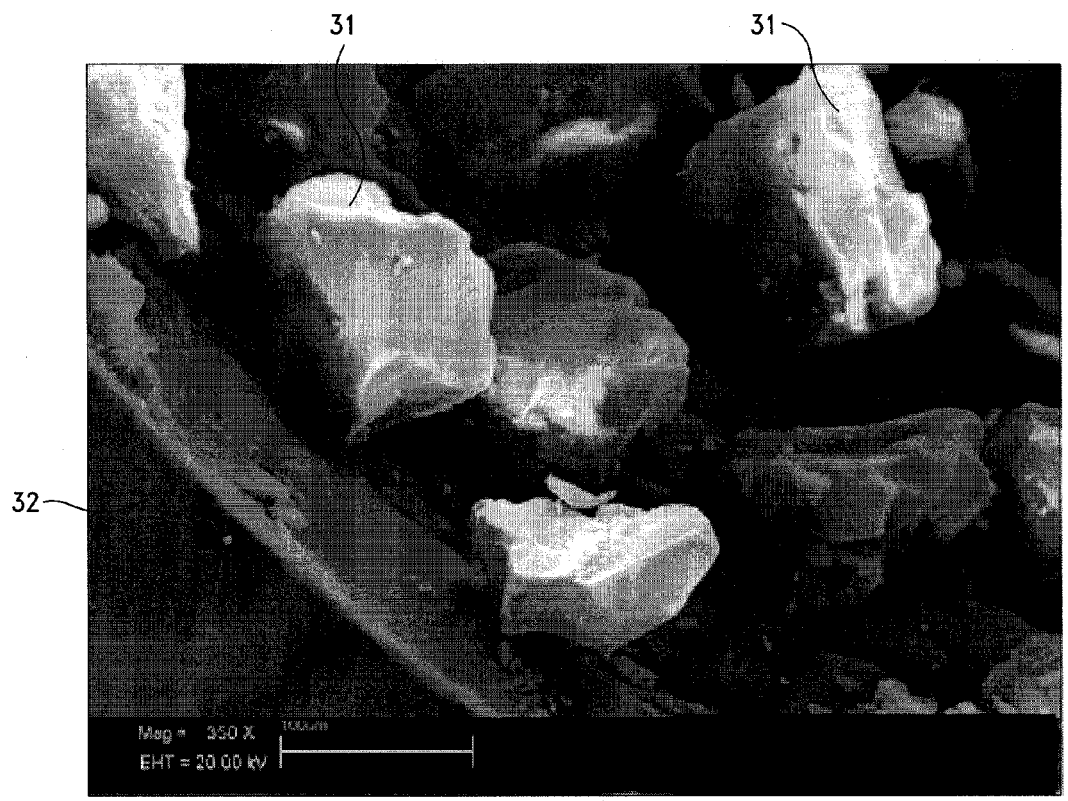
FIG. 11 is an enlarged perspective view of particles embedded in a substrate in accordance with the present invention.

Typically, for a solid-phase support of the invention at least a portion of a particle is embedded in a substrate. The embedded portion can be less than one-half of the particle embedded within the substrate, and more preferably, less than 25%. The embedded portion can be at least 1%, 5%, 10%, 25% or 50% or more. In one embodiment, only a nominal portion of the CPG is embedded within the substrate, as shown in FIG. 11. In this embodiment, CPG 31 is embedded in the bottom of well 33 at a depth of less than approximately 10 microns but, nonetheless, provides a bond that is sufficient to withstand the forces that the particle is subjected to during centrifugation. Such configuration advantageously leaves the majority of the CPG surface exposed, thus maximizing the surface area upon which synthetic reactions may take place.

Figure 9:
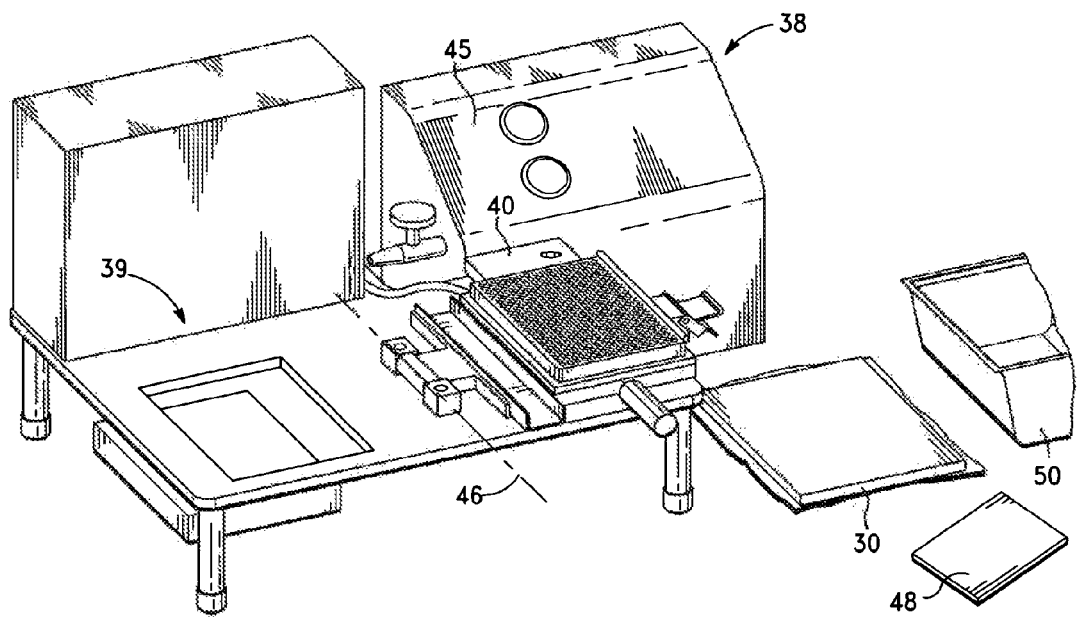
FIG. 9 is a schematic view of the workstation of FIG. 5 in which the applicator has been returned to its loading position and the substrate has been removed from the heating element.

Once the bonding cycle is complete, the applicator can be unlatched and returned to the loading position. The microtiter plate, along with the release sheet, can then be removed from the heating assembly and allowed to cool on a work surface of the workstation (FIG. 9). Once the microtiter plate is cool, the release sheet can be readily removed, typically falling away from the microtiter plate with gravity alone.

Any excess CPG, that is, any CPG that has not been bonded to the microtiter plate can be removed from the microtiter plate and stored in a CPG reclaim container for later use. In this regard, the microtiter plate can be tapped against the reclaim container to dislodge excess CPG. If desired, the entire microtiter plate can also be vacuumed to further remove any remaining excess CPG from the microtiter plate. The microtiter plate can also be visually inspected to evaluate CPG coverage.

In operation and use, the CPG bonded microtiter plate 32 can be used upon various HTS apparatuses including, but not limited to, apparatus 34 for solid-phase combinatorial synthesis which typically proceeds according to the following steps. In a first step, the substrate can be mounted on the rotor assembly. As one or more solid-phase supports are already affixed to the substrate within each well, there is no need to charge the wells with a solid-phase support as is typically done with other microtiter plate-based methods (e.g., charging each well with a slurry of microbeads suspended in a solvent). The solid-phase can be preconditioned with an appropriate solvent, if desired, and the first of the plurality of building blocks or a linker moiety can be covalently linked to the solid-phase supports. Subsequently, a plurality of building block addition steps can be performed, all of which involve repetitive execution of the following or similar sub-steps, and in a sequence chosen to synthesize a desired compound. First, a sufficient quantity of a solution, which contains the building block moiety selected for addition, can be dispensed into the well so that the building block moiety is present in a molar excess to the intermediate compound present in the well. A sub-step reaction can be triggered and promoted by activating reagents and other reagents and solvents, which are also added to the well. The well can then be incubated at a controlled temperature for a time, typically between 5 second and 24 hours, sufficient for the building block addition reaction to go to substantial completion. Optionally, during this incubation, the well can be intermittently agitated, stirred, or the liquid contents otherwise moved to increase the volume of liquid contacting the surface area of the bonded particles. Finally, in a last sub-step of building block addition, the well containing the solid-phase support with attached intermediate compound can be prepared for addition of the next building block by removing the spent reaction fluid and thoroughly washing and reconditioning the solid-phase support.

Washing typically involves one to seven cycles of adding and removing a wash solvent. Optionally, during the addition steps, multiple building blocks can be added to one well in order to synthesize multiple compounds attached to one solidphase support. After the desired number of building block addition steps, the final compound is present in the well and attached to the solid-phase support. The final compounds can be utilized either directly attached to their synthetic solid-phase support, or alternatively, can be cleaved from their support. In the latter case, the linker moiety attaching the compound to the solid-phase support can be cleaved in a variety of ways, and the final compound, or library of compounds can be extracted from the reaction vessel into a liquid-phase.

The substrate and methods of the present invention are advantageously useful for the manual or automated preparation of combinatorial libraries or megaarrays of compounds by fluorous phase organic synthesis. As is well known to those skilled in the art, such combinatorial libraries or megaarrays have numerous uses, in particular, for the selection of pharmaceutical lead compounds, for the optimization of pharmaceutical lead compounds and for the identification and/or isolation of pharmaceutical drugs. The methods and apparatus of the invention for liquid/solidphase separation can also advantageously be used for parallel extraction and purification of compound arrays synthesized or obtained by other methods. Other applications in analytical chemistry (extraction, desalting or other means of parallel preparations of samples), biochemistry (parallel processing of samples) are envisioned.

The affixed-support configuration of the substrate also enables centrifuge-HTS apparatus to run with higher accelerations and velocities compared to systems in which particles are free-floating in a reaction vessel, thus providing quicker cycle times. In particular, the solid-phase support of the present invention is capable of withstanding significant acceleration because any likelihood of particle loss is significantly reduced and/or prevented with the particles securely bonded to the substrate.

The solid-phase support and method of the present invention also obviates the need to design a specific 384 microtiter plate having specific well geometries intended to contain loose liquid-phase particles, as is the case with other centrifugal HTS systems. Bonding the solid-phase supports directly to the substrate of the present invention has resulted in the increased and consistent production of high-quality oligonucleotides even when used in combination with existing centrifuge synthesis technology.

Figure 10:
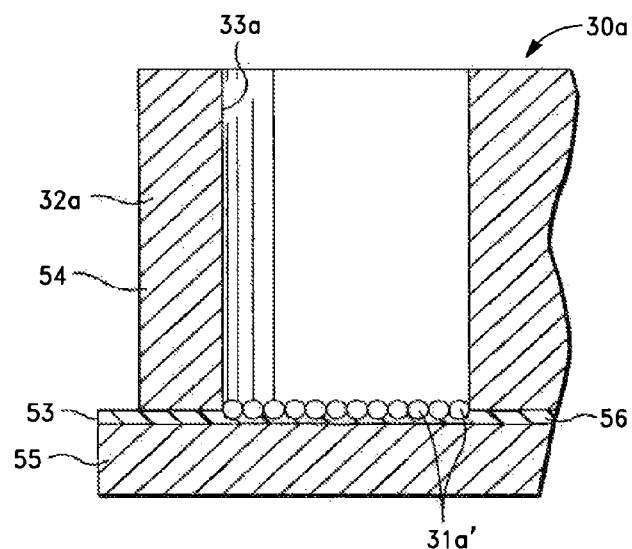
FIG. 10 is a cross-sectional view of another substrate for high-throughput synthesis in accordance with the present invention.

In one embodiment of the present invention, solid-phase support 32a is similar to solid-phase support 32 described above but includes a laminate sheet 53 bonded to a bottomless-well plate 54 as shown in FIG. 10. Like reference numerals have been used to describe like components of solid-phase support 32 and solid-phase support 32a. In this embodiment, the laminate sheet includes a rigid sheet 55 having a layer of hot melt adhesive 56 in which particles 31a are embedded. For example, the laminate sheet can be in the form of a "heat-sealing sheet" that is commonly used to close the contents of a microtiter plate. In operation and use, solid-phase support 32a can be used in substantially the same manner as solid-phase support 32 discussed above.

In another embodiment, the substrate can be formed of a porous polymeric material. Preferably, the porosity of the material allows the substrate to support the liquid-phase within the wells under the normal force of gravity but does not support the liquid-phase under the higher forces of centrifugation. For example, the substrate can be formed of a porous polymeric material including, but not limited to, polyethylene, polypropylene, and other suitable materials. Such porous polymeric materials are typically available in sheets, rods, tubes, and molded shapes and can be machined to form the wells. Porosity of the material typically depends on the specific material and can be as low as 7 urn. As the solid-phase supports are affixed to the substrate, the porosity of the substrate need not be less than the maximum physical dimension of a solid-phase support, as is the case with prior substrates in which the solid-phase supports are merely disposed within the wells. One will appreciate that, in the event the substrate bottom is heated to a temperature approximating the melting point of the substrate material in order to affix the solid-phase supports, the porosity of the well bottom can be substantially impaired or lost. Provided that the sides of the well do not reach the melting point, the porosity of the sides of the well remain porous in such a manner that would facilitate the removal of the liquid-phase.

Alternatively, a solid-phase support can be provided with one or more openings adjacent to the bottom of, and in fluid communication with, the wells to facilitate expulsion of the liquid-phase from the wells. For example, the opening can be a round aperture or one or more slits that would allow expulsion of the liquidphase during centrifugation or other separation procedure including, but not limited to, vacuum, pressure, venturi vacuum, blotting, and other suitable means. Preferably, the opening or openings are dimensioned such that the bulk of the liquid-phase within the wells remains within the wells until a pressure differential is applied to the liquid phase within the wells. Alternatively, larger openings can be utilized with a discrete filter mesh or frit extending across the opening, which mesh or frit is provided to retain the liquid-phase The filter mesh or frit is sufficiently fine to retain the liquid phase within the well under the normal force of gravity but sufficiently course to allow the passage of the liquid-phase through the opening upon the application of a pressure differential.

For convemence m explanation and accurate definition in the appended claims, the terms "upwardly", "bottom", and "side" are used to describe features of the present invention with reference to the positions of such features as displayed in the figures.

In many respects the modifications of the various figures resemble those of preceding modifications and the same reference numerals followed by subscript "a" designate corresponding parts.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of making a substrate for performing a chemical synthesis reaction, the method comprising the steps of:
   providing a dispensing plate comprising a plurality of recesses, wherein the plurality of recesses have one or more particles disposed therein;
   aligning a plurality of reaction vessels with the plurality of recesses, such that each reaction vessel is aligned with a different recess, wherein the plurality of reaction vessels comprises a multiwell substrate comprising a plurality of wells;

dispensing particles from the recesses to the plurality of reaction vessels aligned with the plurality of recesses, the particles being functionalized for covalent attachment of a building block of a synthetic reaction;

permanently embedding the particles in the plurality of reaction vessels; and adding the building block to the particles in a reaction vessel of the plurality of reaction vessels.

2. The method of claim 1, wherein the providing step includes brushing the particles into the plurality of recesses of the dispenser plate.

3. The method of claim 1, wherein the dispensing step further comprises contacting the dispensing plate and the multiwell substrate.

4. The method of claim 3, wherein the dispensing step further comprises pivoting the dispensing plate into engagement with the multiwell substrate.

5. The method of claim 1, wherein the embedding step comprises heating the plurality of reaction vessels.

6. The method of claim 5, wherein the embedding step comprises providing a pressure to bias the plurality of reaction vessels against a heating element.

7. The method of claim 5, wherein the embedding step comprises providing a pressure to the plurality of reaction vessels biasing the particles against the bottom of the reaction vessels.

8. The method of claim 1, wherein one or more of the particles remain nonbonded to each reaction vessel.

9. The method of claim 8 further comprising the step of removing the one or more nonbonded particles from each reaction vessel.

10. The method of claim 1, wherein the plurality of reaction vessels is constructed from a bottomless-well plate and a rigid sheet.

11. The method of claim 10 further comprising providing a layer of hot-melt adhesive to the rigid sheet to form a laminate sheet, applying the laminate sheet to a bottom surface of the bottomless-well plate thereby forming the plurality of reaction vessels.

12. The method of claim 1, wherein the particles comprise microbeads.

13. The method of claim 1, wherein the particles comprise controlled pore glass.

14. The method of claim 13, wherein the particles comprise 1400 Angstrom controlled pore glass.

15. The method of claim 1, wherein the particles are selected from the group consisting of glass, plastic, polystyrene, resin, gel, agarose and sepharose.

16. The method of claim 1, wherein less than one-half of the particles is embedded into the reaction vessels.

17. The method of claim 1, wherein less than 25% of the particles is embedded in the reaction vessels.

18. The method of claim 1, wherein a majority of the surface of the particles is exposed.

19. The method of claim 1, wherein the plurality of reaction vessels is plastic.

* * * * *